Dec. 16, 1969  YOSHIKI NAGAI ET AL  3,484,659
BATTERY CHARGING REGULATOR
Filed Dec. 26, 1967  2 Sheets-Sheet 1

INVENTOR
Yoshiki Nagai
Akira Kito
BY
Watson, Cole, Grindle + Watson
ATTORNEY

Dec. 16, 1969    YOSHIKI NAGAI ET AL    3,484,659
BATTERY CHARGING REGULATOR
Filed Dec. 26, 1967                        2 Sheets-Sheet 2

INVENTOR
Yoshiki Nagai
Akira Kita

BY Watson, Cole, Grindle & Watson
ATTORNEY 3,484,659
BATTERY CHARGING REGULATOR
Yoshiki Nagai and Akira Kita, Takatsuki, Japan, assignors to Yuasa Battery Company Limited, Takatsuki, Osaka Prefecture, Japan
Filed Dec. 26, 1967, Ser. No. 693,337
Int. Cl. H01l 3/00, 5/00
U.S. Cl. 317—234                    10 Claims

ABSTRACT OF THE DISCLOSURE

This invention relates to a charging control element for a battery in which a semiconductor is used. Said semiconductor is made by making one PN junction in one silicon pellet, placing a plurality of the pellets thus treated one upon another in the same direction, and connecting said plurality of pellets to each other by use of a soldering material containing lead and tin as its main constituent. The charging control element thus obtained can efficiently control charging of a secondary battery and particularly a sealed secondary battery.

---

This invention relates to a battery charging element which is used for charging a secondary battery and particularly to a sealed secondary battery and in which a semiconductor is used.

The important thing in charging a secondary battery is to prevent the overcharging of battery by decreasing a charging current at the final period of charging time, thus allowing the battery to be charged safely, simply and automatically. As will be later described in detail, it has been a conventional practice with this type of charging element to form a charging circuit by use of a Zener diode to charge a battery. It is however very difficult to manufacture an element that works in response to a battery charging voltage whose allowable limit is narrow and it has been impossible to obtain desirable results. This invention has made it possible to provide an entirely new charging control element.

An object of this invention is to provide a charging control element that efficiently and safely charges a secondary battery and particularly a sealed secondary battery.

Another object of this invention is to provide a charging control element that charges a secondary battery and particularly a sealed secondary battery within a short time and also controls a charging current in such manner that the charging current may be safely decreased at the final period of charging time, even if the battery is left in an energized state.

A further object of the invention is to provide a charging control element having an ability for a negative resistance sphere.

A still further object of the invention is to provide a charging control element having substantially the same temperature coefficient as that of a battery.

A still further object of the invention is to provide a charging control element which radiates the heat generated by the element at constant speed.

The objects and advantages of the invention will be more fully understood from the following description of preferred forms of the invention shown by way of example in the accompanying drawings in which:

FIG. 1 is a basic circuit diagram showing the use of a charging control element;

FIG. 2 diagrammatically shows curves illustrative of a relationship between a charging time of the circuit shown in FIG. 1 and a charging current and battery voltage;

FIG. 3 diagrammatically shows a curve illustrative of a relationship between the thermal coefficient of a Zener voltage and the Zener voltage of a Zener diode;

Figure 6:
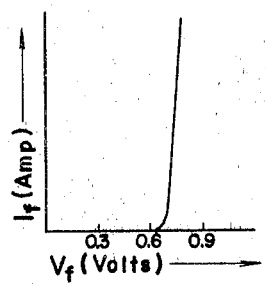
Figure 7:
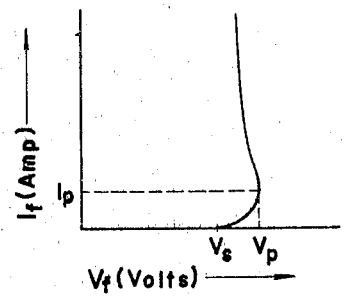
Figure 8:
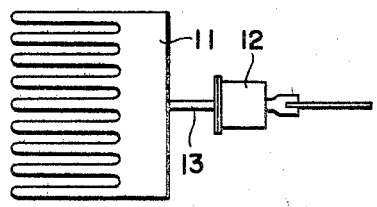
Figure 9:
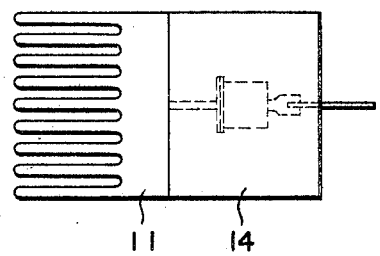
Figure 10:
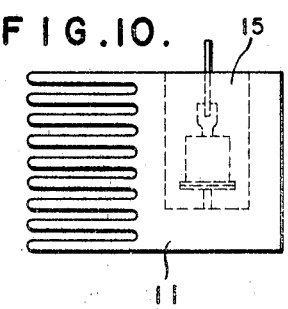
Figure 11:
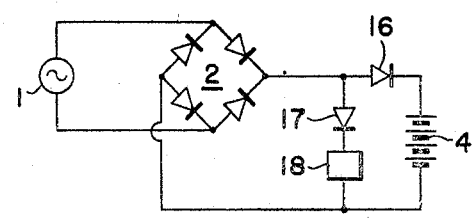
Figure 12:
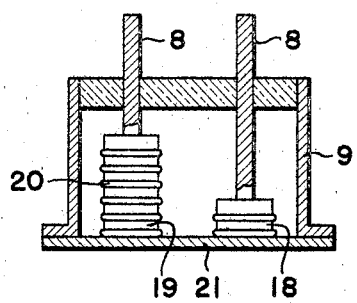
Figure 13:
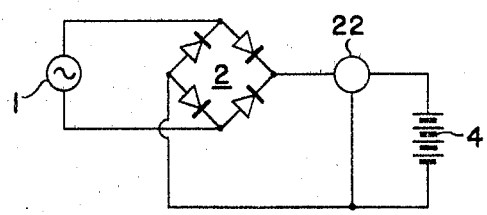
Figure 15:
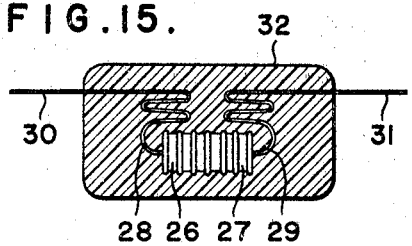
Figure 14:
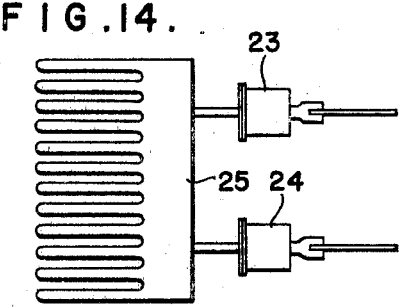

FIG. 6 diagrammatically shows a curve illustrative of the forward voltage and current characteristics of silicon diode;

FIG. 7 diagrammatically shows a diagram illustrative of the voltage and current characteristics of the charging control element according to the invention;

FIG. 8 is a side view of a charging control element in the form of another embodiment of the invention;

FIG. 9 is a side view of a modification of FIG. 8;

FIG. 10 is a side view of another modification of FIG. 9;

FIG. 11 is a circuit diagram in which the charging control element of the invention is used;

FIG. 12 is a sectional view of another modification of the charging control element according to the invention;

FIG. 13 is a circuit diagram in which the charging control element shown in FIG. 12 is used;

FIG. 14 is a side view of the charging control element shown in the form of a modification of the invention; and FIG. 15 is a side view of the main part of the charging control element shown in the form of another modification of the invention.

Figure 1:
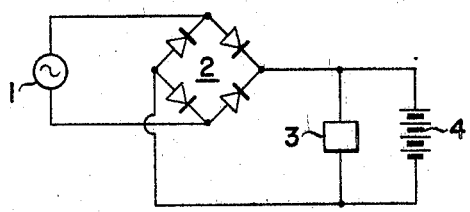
Figure 2:
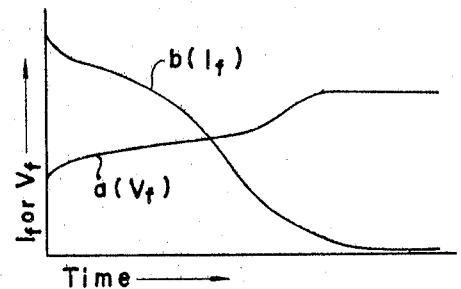

Referring now to the use of the charging control element of the invention in accordance with the basic circuit diagram of FIG. 1, the numeral 1 indicates an AC power source; 2, a rectifier; 3, a battery charging control element according to this invention; and 4 designates a battery to be charged. When the battery 4 is charged in accordance with this circuit, a greater part of DC $b$ obtained from the rectifier 2 flows to this battery circuit at the initial stage of charging as shown in FIG. 2 and charges the battery 4, but when the battery 4 is charged and accordingly voltage $a$ is increased, the charging voltage of the battery also becomes higher than the voltage of the control element, a greater part of the current is bypassed to the control element and the battery is charged by a very small amount of electric current.

Figure 3:
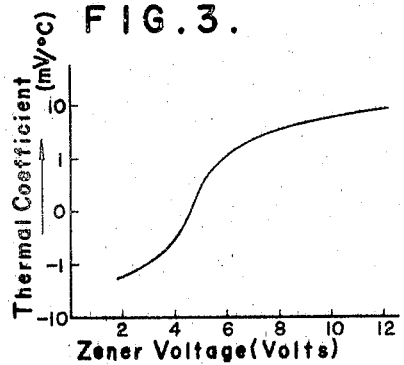

It is a well-known fact that a Zener diode has been conventionally used as an element for controlling the charging of a battery by use of such a circuit. But a Zener diode has the disadvantage that first the limit allowable as charging voltage of a battery is so small as on the order of ±0.02 v. per battery at most, and accordingly it is impossible to manufacture a Zener diode of such a small voltage limit, and that secondly the temperature coefficient of the Zener voltage of a Zener diode varies with the Zener voltage as shown in FIG. 3, but the temperature coefficient of the charging voltage of a battery is on the order of −6.0 mv/° C. in the case of a lead battery and on the order of −3.0 mv./° C. in the case of a nickel-cadmium battery and accordingly it becomes impossible to bring the temperature coefficient of a Zener diode into agreement with that of the battery. Such being the disadvantages, it is difficult to establish the charging circuit of this system by use of a Zener diode, and even if such a circuit were realized, it would not be an ideal one.

Figure 4:
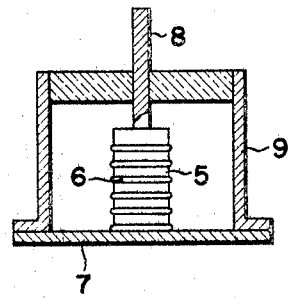
FIG. 4 is a sectional view of the main part of the charging control element in the form of a preferred embodiment of this invention.
Figure 5:
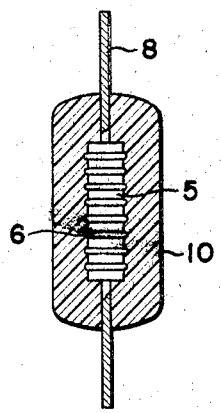
FIG. 5 is a sectional view of the main part of the charging control element in the form of another embodiment of this invention.

This invention relates to a charging control element produced by use of a new semiconductor from which the disadvantages inherent in a Zener diode have been removed. As shown in FIG. 4, one PN junction is made in a silicon pellet 5 by a diffusion method or an alloying method and a metal layer is formed on both sides of the silicon pellet as by plating, and the silicon pellet thus treated is laid one upon another, welded and fixed to each other in the same direction by use of a soldering material layer 6 containing lead and tin as its main constituent. The silicon pellets thus welded and fixed to each other are fixed to a base plate 7 by use of a soldering material and a metal lead 8 is fixed to the opposite side and then hermetically sealed by use of glass-metal hermetic seal 9. Alternatively, as shown in FIG. 5, the charging control element is completed by embedding the silicon pellets in a resin 10 with metal leads 8 fixed on both ends of pellets 5. FIG. 6 shows the current and voltage characteristics produced when plus potential and minus potential are respectively applied to the P side and the N side of one PN junction formed in the silicon pellet by a diffusion method or an alloying method. It is seen from the characteristics that when the voltage is below about 0.6 v., an electric current does not flow, but when the voltage exceeds 0.6 v. the current begins to flow and when the voltage exceeds about 0.7 v., the current is brought to a normal state. A close inspection of the characteristics will show that the characteristics vary depending upon the electric resistance of silicon used initially as a raw material, namely the purity of silicon and that further they vary with temperature, that is, conductivity is improved with the increased temperatures of the silicon pellets and brought to a conductive state at low voltage. Accordingly, when, as shown in FIG. 4, the voltage and current characteristics of the control element formed by welding and fixing a plurality of pellets in series by use of a soldering material layer of specific thickness are inspected by applying a plus potential and a minus potential respectively to the P side and to the N side of the control element thus formed, it has become apparent that the heat generated inside the pellets by the current that flowed was different in radiation in such a manner that, because the heat which was generated on the inner portion of the pellets could not be released outside unless it passed either through the soldering material layer of specific thickness used in welding and fixing or through the silicon pellets on the outer side of the silicon pellets and that accordingly the pellets themselves rose in temperature and a voltage drop rate became inferior in proportion to the rise in the temperature of the pellets. Therefore, the general characteristics of the semiconductor formed of a multiplicity of layers as shown in FIG. 7 indicates that an electric current does not flow unless the voltage exceeds a VS (forward threshold voltage) point and that it begins to flow when it exceeds VS, and it is substantially brought to a conductive state when the voltage reaches VP (forward peak voltage) and that the current which flowed increases the temperature of the pellets especially in the inner part thereof to such a degree that a further flow of an electric current would on the contrary decrease voltage, that is, negative resistance come out. This VP value and the current value IP (current at forward peak voltage) prevailing then are important for the battery charging control element. That is to say, the battery that is attached in parallel to the control element is charged up to this voltage, and when charging exceeds the voltage, the current that flows through the control element increases, with the result that the voltage drops and the current flows more and more into the control element until finally the amount of current through the battery becomes so very small that it falls into a state of maintenance charging. The controlling ability of the control element depends upon the current value IP. That is, if too strong a current in comparison with IP is supplied to the battery from the beginning, the amount of current the control element absorbs at the final stage of charging becomes too large and raises the temperature of the element too high, with the result that a voltage drop becomes too small and conversely the battery begins to discharge through the control element.

Researches have been carried out to make the VP value and IP value suitable for the control element of various types of batteries, and the following fact has been discovered.

Firstly, by analyzing the fact that a rise in temperature caused by the current in the inner part of the pellets when the pellets were placed in layers depended greatly upon the thickness of soldering material layers, it has been found that a current capacity, i.e., a control ability also depends upon the thickness of soldering material layers. In the final analysis, it is desirable to limit the escape of heat from the inner part of the pellets placed in layers in order to obtain a high efficiency semiconductor. It has been found that the soldering material layers produced experimentally with lead and tin as the main constituent of the soldering material is $10\mu$ in the minimum thickness and that, when the soldering material is below that in thickness, a rise in the temperature of the inner part of the pellets is not sufficient and hence the charging control ability cannot be brought into full play. It also has become apparent that the upper limit of thickness is $200\mu$ at maximum, and when exceeded, the temperature of the inner part of the pellets becomes so high and a voltage drop becomes so small that the control element is deprived of its function.

Secondly, the relation between the mean value of VP per pellet of and the electric resistance of the silicon material obtained by using lead as a main constituent of the soldering material to be laid between the pellets and by fixing the thickness of the soldering material layers at $100\pm10\mu$ is shown in the table below with reference to the relation between the silicon material and the VP shown in FIG. 7, for example in the case of a four pellet element.

| Electric resistance of silicon material Ω: | Mean VP per pellet |
|---|---|
| 0.001 | 0.720 |
| 0.005 | 0.725 |
| 0.01 | 0.730 |
| 0.05 | 0.737 |
| 0.1 | 0.735 |
| 0.5 | 0.730 |
| 1.0 | 0.723 |
| 5.0 | 0.721 |
| 10.0 | 0.720 |
| 50.0 | 0.721 |
| 100.0 | 0.723 |
| 500.0 | 0.728 |
| 1.000 | 0.730 |

The charging voltage that is essentially determined by a battery constituting material is existent in a battery and the value of the charging voltage is on the order of 2.40 v. per cell in the case of a sealed lead battery and on the order of 1.47 v. per cell in the case of a sealed nickel-cadmium alkaline battery.

According to the table shown above, it is desirable in the case of a sealed nickel-cadmium alkaline battery to use a pellet made of silicon and having an electric resistance of 0.01Ω to 0.1Ω by laying two pellets in layers per cell, and it has become apparent that the use of the pellet made of silicon having an electric resistance of 0.001Ω to 0.01Ω or 1 to 100Ω by laying 10 of such pellets in layers per 3 cells is most suitable for the charging control element of a sealed lead battery, because it is difficult in the case of the sealed lead battery to decide the appropriate number of pellets to be laid in layers per cell and because it is often the case with the lead battery to use a multiple of 3 cells.

The temperature coefficient of VP of each pellet is on the order of −1.5 mv./° C. and accordingly two pellets per cell for a sealed alkaline battery amount to about −3.0 mv./° C. which corresponds to about −3.0 mv./° C. of the temperature coefficient of the battery. The use of 10 pellets laid in layers per 3 cells in the case of the sealed lead battery is 3.33 pellets per cell and hence amounts to about −5.0 mv./° C. and corresponds to about −6.0 mv./° C. of the temperature coefficient of the battery.

Thirdly, it has been found necessary to provide the outside of the control element with fins in order to improve the control ability and increase efficiency of the semiconductor manufactured as described above by use of the method developed in conjunction with a silicon material and soldering material layers, but on the other hand it also has been found that an unmodified application of the use of the cooling fins such as used in ordinary semiconductor elements to the semiconductor in this case cannot bring about a satisfactory result. That is to say, it sometimes happens that the mere provision of the control element with the cooling fins in an ordinary manner results in an increased radiation of heat from the control element and cannot make the control element form a negative resistance sphere necessary for the element. In order to eradicate the disadvantages of the kind described, a conductor 13 that confines the escape of heat to a predetermined limit is disposed between cooling fins 11 having a specific heat capacity and a cooling area and an element 12 as shown in FIG. 8. For example, the cooling fins and the element are connected to each other by means of a metal wire having a specific diameter and length. By so doing, the control ability of the element can be increased without losing the negative resistance sphere.

The means of the character described alone is not sufficient for the prevention of the escape of heat from the element portion directly to the outer atmosphere, and accordingly when the wind blows against the element, it sometimes happens that the voltage and current characteristics of the element may finely change and deviate from predesigned characteristics. In order to prevent such a possibility and to prevent the element from coming into direct contact with the outer atmosphere as shown in FIGS. 9 and 10, the circumference of the element is covered with a heat insulating material 14 or the element is embedded in the hole 15 formed inside a cooling body to disunite the element portion from the outer atmosphere. By so doing, it has become apparent that highly constant operation can be maintained.

Fourthly, when the temperature of the charging control element becomes too high for any of the reasons described above in charging the battery through the circuit shown in FIG. 1, the voltage of the charging control element drops unusually, with the result that not only the charging current begins to flow entirely to the control element but the battery itself begins to discharge through the control element, thus making it impossible to attain charging. In order to remove the disadvantages of the kind described, a blocking diode 16 serving to conduct electricity in time of charging and to block electricity in time of discharging may be disposed in the circuit in series with a battery 4 as shown in FIG. 11. But when said blocking diode 16 is provided, it is necessary to simultaneously incorporate in the circuit a compensating diode for compensating a voltage drop in series with the control element 3. Of course, this circuit can fully attain its purpose if the circuit shown in FIG. 11 is constituted by individual diodes, but from the fact that a better result can be obtained when the blocking diode 16 and the compensating diode 17 are placed under the same temperature conditions, it has become apparent that a better result can be obtained by utilizing a structure in which a blocking diode 18, compensating diode 19 and a control element 20, as shown in FIG. 12 are welded in series to each other and then fixed to the base plate 21 or a structure in which the blocking diode 18, compensating diode 19 and control element 20 are connected to each other by a good conductor as shown at 22 in FIG. 13.

Fifthly, when it is necessary to place a multiplicity of pellets in layers, for example, when 10 pellets are placed in layers for three cells of a lead battery, it is difficult to assemble such pellets in a multiplicity of layers. Therefore, those 10 pellets are divided into two groups of five and the base plate side is assembled on P with respect to first five pellets and the base plate side is assembled on N with respect to the remaining five pellets, and two groups 23 and 24 are fitted together to one cooling plate 25. This approach facilitates the assembling as shown in FIG. 14.

Sixthly, when a battery charging control element of very small capacity is desired, it is necessary to prevent the escape of heat outwardly that was generated inside the control element, in order to reduce IP of FIG. 7. Accordingly, it is contemplated to prevent as much as possible a drop in the temperature of pellets caused by the escape of the heat which is generated by confining long thin wires 30 and 31 within a container 32 before lead wires 28 and 29 extending from pellets 26 and 27 at both ends are introduced outside as shown in FIG. 15. The charging control element for a battery of very small capacity can be obtained by the structure of the character described.

A charging control element of high efficiency for batteries of various types and capacities can be produced by one or a combination of the various methods described above, and it is to be understood that many changes and modifications could be made in the invention without departing from the scope and spirit thereof.

What is claimed is:

1. A semiconductor charging control element for a battery comprising silicon pellets each having a single PN junction therein, a plurality of said pellets stacked one upon another with the N sides of the pellets engaging the P sides of suceeding pellets respectively, and a layer of solder containing a material selected from the group consisting of lead and tin and combinations thereof as the main constituent, disposed between and bonding said pellets respectively to each other, said layer being from 10 to 200 microns thick in each space between the pellets.

2. A semiconductor charging control element as claimed in claim 1 for use with one sealed alkaline battery, comprising two of said pellets each having an electrical resistance of $0.01\Omega$ to $0.1\Omega$ cm.

3. A semiconductor charging control element as claimed in claim 1 for use with a plurality of sealed alkaline batteries, comprising twice as many of said pellets as said plurality of batteries, each said pellet having an electrical resistance of $0.01\Omega$ to $0.1\Omega$ cm.

4. A semiconductor charging control element as claimed in claim 1 for use with three sealed lead batteries, comprising ten pellets, each having an electrical resistance of $0.001\Omega$ to $0.01\Omega$ cm. or $1\Omega$ to $100\Omega$ cm.

5. A semiconductor charging control element as claimed in claim 1 further comprising heat conductor means and cooling fins, said heat conductor means having a specific limited heat conduction capacity between said pellets and said cooling fins, said cooling fins having a specific heat capacity and cooling area.

6. A semiconductor charging control element as claimed in claim 5 wherein said heat conductor is a metal wire of specific length.

7. A semiconductor charging control element as claimed in claim 5 wherein said stack of pellets are thermally insulated from the atmosphere, said cooling fins alone being in contact with the atmosphere.

8. A semiconductor charging control element as claimed in claim 1 further comprising a group of blocking silicon pellets having a PN junction therein in parallel with said stack of pellets for preventing said battery discharging through said stack and a group of compensating pellets in series with said stack of pellets for compensating the voltage of said blocking pellets.

9. A semiconductor charging control element as claimed in claim 1 comprising two sets of said stacked pellets, the P side of an end pellet of one of said stacks and the N side of an end pellet of the other of said stacks being connected to a common cooling plate for dissipating heat.

10. A semiconductor charging control element as claimed in claim 1 wherein said stack of silicon pellets is housed in a container with long thin lead wires extending from opposite ends of said stack to prevent dissipation of heat from said stack.

References Cited

UNITED STATES PATENTS

| | | | |
|---|---|---|---|
| 2,750,540 | 6/1956 | Waldkotter et al. | 317—241 X |
| 2,863,105 | 12/1958 | Ross | 317—234 |
| 2,986,678 | 5/1961 | Andres et al. | 317—234 |

JAMES D. KALLAM, Primary Examiner

U.S. Cl. X.R.

320—2